US012809221B2

(12) United States Patent
Killilea et al.

(10) Patent No.: US 12,809,221 B2
(45) Date of Patent: Nov. 24, 2026

(54) COMPOSITION AND METHOD FOR FORMING AN ELECTROCHROMIC LAYER

(71) Applicant: AMPERIAL TECHNOLOGIES GMBH, Igensdorf (DE)

(72) Inventors: Niall Killilea, Fuerth (DE); Oleksandr Mashkov, Buckenhof (DE); Wolfgang Heiss, Nuremberg (DE)

(73) Assignee: AMPERIAL TECHNOLOGIES GMBH, Igensdorf (DE)

( * ) Notice: Subject to any disclaimer, the term of this patent is extended or adjusted under 35 U.S.C. 154(b) by 283 days.

(21) Appl. No.: 18/833,750

(22) PCT Filed: Jan. 18, 2023

(86) PCT No.: PCT/EP2023/051129
§ 371 (c)(1),
(2) Date: Jul. 26, 2024

(87) PCT Pub. No.: WO2023/143984
PCT Pub. Date: Aug. 3, 2023

(65) Prior Publication Data

US 2025/0189857 A1 Jun. 12, 2025

(30) Foreign Application Priority Data

Jan. 27, 2022 (EP) .................................... 22153742

(51) Int. Cl.

| | |
|---|---|
| ***G02F 1/1524*** | (2019.01) |
| ***B82Y 20/00*** | (2011.01) |
| ***C09K 9/00*** | (2006.01) |
| ***G02F 1/1333*** | (2006.01) |

(52) U.S. Cl.
CPC .......... *G02F 1/15245* (2019.01); *B82Y 20/00* (2013.01); *C09K 9/00* (2013.01); *G02F 1/133345* (2013.01)

(58) Field of Classification Search
CPC ........... G02F 1/15245; G02F 1/133345; B82Y 20/00; C09K 9/00
See application file for complete search history.

(56) References Cited

U.S. PATENT DOCUMENTS

2015/0331295 A1* 11/2015 Takahashi ............. G02F 1/1524 359/275

FOREIGN PATENT DOCUMENTS

| | | | |
|---|---|---|---|
| CN | 108 828 868 A | 11/2018 | |
| WO | 2014/161382 A1 | 10/2014 | |
| WO | WO-2019030269 A1 * | 2/2019 | ........... C09D 11/037 |

OTHER PUBLICATIONS

International Search Report and Written Opinion for Appln. No. PCT/EP2023/051129 mailed Mar. 30, 2023, 7 pages.

* cited by examiner

*Primary Examiner* — James C. Jones
(74) *Attorney, Agent, or Firm* — Prismatic Law Group, PLLC; Ronald J. Kamis

(57) ABSTRACT

The invention concerns a composition for forming an electrochromic layer which composition comprises or consists of the following components: Nanoparticles of electrochromic material, a solvent, a surface ligand adsorbed on the surfaces of the nanoparticles and either a photoacid, wherein the photoacid is also adsorbed on the surfaces of the nanoparticles, or decomposition products resulting from decomposition of a photoacid by irradiation, wherein the decomposition products are also adsorbed on the surfaces of the nanoparticles, wherein the decomposition products are organic components, acidic components, protons, cationic components, anionic components and/or radical components, wherein the nanoparticles in the composition are colloidal nanoparticles uniformly distributed within the solvent.

14 Claims, No Drawings

COMPOSITION AND METHOD FOR FORMING AN ELECTROCHROMIC LAYER

CROSS-REFERENCE TO RELATED APPLICATIONS

This application claims priority to co-pending PCT International Application Serial No. PCT/EP2023/051129 filed Jan. 18, 2023, which claims priority to European Patent Application No. 22153742.6 filed on Jan. 27, 2022, the entire contents of both of which are incorporated herein by reference.

FIELD

The present invention relates to a composition and a method for forming an electrochromic layer. The present invention also relates to an electrochromic device and a use for forming an electrochromic layer. The composition comprises nanoparticles of an electrochromic material, a solvent and a surface ligand adsorbed on the surfaces of the nanoparticles.

BACKGROUND

Electrochromic devices change their color, opacity, reflection or absorption in response to either an electron transfer process or application of an electrical potential. The change of color, opacity, reflection or absorption relies among other parameters on maximal achievable contrast, the switching voltage and switching speed of the electrochromic device. The maximal achievable contrast refers to the maximal contrast difference achievable from a first optical state to a second optical state. The switching voltage generally refers to the voltage that needs to be applied for the transition from the first optical state to the second optical state. The switching speed generally refers to the rate at which an electrochromic device transitions from the first optical state to the second optical state when a voltage is applied or removed.

Crystalline, colloidal nanocrystals for electrochromic purposes are typically synthesized at temperatures of 200° C. and above in organic coordinating solvents with relatively large organic molecules such as oleic acid, oleylamine and myristic acid. The relatively large organic molecules adsorb to the surface of the nanocrystals as they grow, thereby inhibiting the growth and enabling size and shape control of the nanoparticles.

Zhang, L. et al. "Flexible Pseudocapacitive Electrochromics via Inkjet Printing of Additive-Free Tungsten Oxide Nanocrystal Ink." Adv. Energy Mater. 2020, 10, 2000142 discloses the formulation of tungsten oxide nanocrystals without any additives for the printing of tungsten oxide thin films. For that, tungsten chloride is first added to oleic acid under stirring followed by injection of the tungsten chloride precursor to a mixture of oleic acid and oleylamine at 300° C. and incubation for 5 min. After cooling to room temperature, isopropanol and deionized water are added. Subsequently, the nanoparticles are centrifuged, washed and dispersed in hexane. The organic surface coordinating ligands oleylamine and oleic acid are stripped off by mixing the nanoparticles with triethyloxonium tetrafluoroborate dissolved in acetonitrile under ambient condition.

Heo, S. et al. "Template-free mesoporous electrochromic films on flexible substrates from tungsten oxide nanorods." Nano let. 2017, 17, 5756-5761 discloses a low-temperature and template-free method to fabricate mesoporous thin films of tungsten suboxide nanorods. The tungsten suboxide nanorods are capped with oleylamine. In order to prevent etching of the tungsten suboxide nanorods, the oleylamine ligands are removed using Meerwein's salt ($Et_3OBF_4$). In contrast to ligand-capped nanorods, deposition of thin films from dispersions of ligand-stripped, charge-stabilized nanorods resulted in a mesoporous structure associated with the random orientation of the nanorods.

In Zhang, S. et al. "Monoclinic oxygen-deficient tungsten oxide nanowires for the dynamic and independent control of near-infrared and visible light transmittance." Mater. Horiz. 2018, 5: 291-297 the dynamic control of near-infrared and visible light spectral regions transmittance by monoclinic oxygen-deficient tungsten oxide nanowire thin films is disclosed. The monoclinic oxygen-deficient tungsten oxide nanowire thin films are prepared by colloidal synthesis of oleylamine-capped $W_{18}O_{49}$ nanowires followed by spin-coating of $W_{18}O_{49}$ nanowires on an indium tin oxide glass. Subsequently, thermal annealing in air was performed in order to remove the layer of oleylamine and oxidize $W_{18}O_{49}$ to obtain a near-stochiometric monoclinic tungsten oxide thin film with a thickness of approximately 450 nm.

Nanoparticles capped with organic coordinating agents demonstrate a relatively low electrical conductivity which is critical to electrochromic device operation. Therefore, the organic coordinating agent is usually removed from the surfaces of the nanoparticles in order to form an electrically conductive layer with electrochromic properties. This can be done thermally or by chemical ligand stripping.

In WO 2016/134010 A1, a method of charging an electrochromic device is disclosed. This method includes either post-assembly charging using a sacrificial redox agent, lithium diffusion into an electrode from a lithium layer, salt bridge charging or pre-assembly charging using proton photoinjection into an electrode. The electrochromic device may include a working electrode including transparent electrically conducting oxide nanoparticles and a nanostructured transition metal oxide bronze layer, a solid-state electrolyte, in particular a polymer electrolyte formulation, and a counter electrode including a nanostructured material that is optically passive to NIR and visible radiation during modulation. On the surface of the transition metal oxide-containing electrode, organic oxygen-containing molecules may be provided, and the unshared electron pair of an oxygen atom of the adsorbed molecule may be pulled to a surface transition metal cation during the photoinjection of the proton into the electrode. The sacrificial redox agent is added to the polymer electrolyte formulation and selected based on characteristics including high boiling point, low electrochemical potential for oxidation and irreversible oxidation. The sacrificial redox agent may include alcohols, nitrogen heterocycles, alkenes and functionalized hydrobenzenes.

Ivanovskaya, A. et al. "High throughput screening and measurements of proton conductivity of newly developed PEM materials based on proton transport visualization." Journal of Membrane Science 330, 2009, 326-333 discloses an electrochromic method for proton transport visualization using an all-solid electrochemical cell comprising a thin film of chemo-chromic tungsten oxide in the presence of atomic hydrogen. Here, circles of tungsten oxide, 500 nm thick and 5 mm in diameter, were deposited on an FTO-coated glass substrate. Subsequently, solutions with different concentrations of photoacid generators were drop-cast on the circles followed by irradiation with an UV lamp for 12 h to allow photoacid decomposition.

In WO 2019/030269 A1, compositions comprising nanoobjects comprising one or more oxides of tungsten, water, an organic liquid having a boiling point below 120° C. which is not polymerizable, one or more kinds of polymerizable moieties which are polymerizable by radical polymerization, one or more initiators for initiating radical polymerization of said one or more kinds of polymerizable moieties and an aprotic organic liquid having a boiling point of 120° C. or higher are disclosed.

WO 2014/161382 A1 discloses a method for making a nanowire-based electrode having homogenous optical property and heterogeneous electrical property. The method comprises: providing a substrate, coating a solution comprising silver nanowires on to the substrate to form a layer of nanowire film; positioning a mask above the nanowire film, shining UV light above the mask; converting the silver nanowires to silver oxides by photo acid generator and UV light; annealing the film.

CN 108828868 A discloses a preparation method of an electrochromism thin film. The prepared electrochromism thin film is formed by compounding a metal oxide with a transparent conductive oxide (TCO) and a transparent conductive substrate. A mixing method is adopted for preparing a coating film solution of the metal oxide and the TCO, and then a wet coating method is adopted for preparing the electrochromism oxide nanometer thin film.

SUMMARY

The problem to be solved by the present invention is to provide an alternative composition, a use of that composition, an alternative method for forming an electrochromic layer on a substrate and a device comprising such an electrochromic layer.

The problem is solved by the subject-matter of the claims.

In an embodiment, a composition for forming an electrochromic layer comprises a solvent, nanoparticles of electrochromic material, wherein the nanoparticles are colloidal nanoparticles uniformly distributed within the solvent, a surface ligand adsorbed on the surfaces of the nanoparticles, and a photoacid, wherein the photoacid is also adsorbed on the surfaces of the nanoparticles, wherein the photoacid is a polar molecule that becomes more acidic upon electromagnetic irradiation with light.

In an embodiment, a method for forming an electrochromic layer on a substrate includes the steps of: a) providing a composition and a solid substrate, wherein the composition comprises: (i) a solvent, (ii) nanoparticles of electrochromic material, wherein the nanoparticles are colloidal nanoparticles uniformly distributed within the solvent, (iii) a surface ligand adsorbed on the surfaces of the nanoparticles, and (iv) a photoacid, wherein the photoacid is also adsorbed on the surfaces of the nanoparticles, wherein the photoacid is a polar molecule that becomes more acidic upon electromagnetic irradiation with light, b) applying the composition to a surface of the substrate, c) heating the composition on the substrate or the substrate together with the composition to a temperature, wherein the temperature is a temperature in the range of 25° C. to 200° C. and maintaining the composition or the substrate together with the composition at the temperature, and d) waiting until at least 90% by weight of the initial weight of the solvent is evaporated and irradiating the composition on the substrate with an electromagnetic irradiation of a wavelength suitable for decomposition of the photoacid, wherein the wavelength is a wavelength in the range of 200 nm to 500, and wherein evaporation of the solvent is measured by determination of a loss of total weight of the substrate and the composition on the substrate.

In an embodiment, an electrochromic device includes an electrochromic layer and a solid substrate, wherein the electrochromic layer is formed by a) applying a composition to a surface of the substrate, wherein the composition comprises: (i) a solvent, (ii) nanoparticles of electrochromic material, wherein the nanoparticles are colloidal nanoparticles uniformly distributed within the solvent, (iii) a surface ligand adsorbed on the surfaces of the nanoparticles, and (iv) a photoacid, wherein the photoacid is also adsorbed on the surfaces of the nanoparticles, wherein the photoacid is a polar molecule that becomes more acidic upon electromagnetic irradiation with light, c) heating the composition on the substrate or the substrate together with the composition to a temperature, wherein the temperature is a temperature in the range of 25° C. to 200° C. and maintaining the composition or the substrate together with the composition at the temperature and d) waiting until at least 90% by weight of the initial weight of the solvent is evaporated and irradiating the composition on the substrate with an electromagnetic irradiation of a wavelength suitable for decomposition of the photoacid, wherein the wavelength is a wavelength in the range of 200 nm to 500, and wherein evaporation of the solvent is measured by determination of a loss of total weight of the substrate and the composition on the substrate, wherein the electrochromic layer and the substrate are in electrically conductive contact to each other.

DETAILED DESCRIPTION

According to the invention a composition for forming an electrochromic layer is provided, wherein said composition comprises or consists of the following components: Nanoparticles of electrochromic material, a solvent, a surface ligand adsorbed on the surfaces of the nanoparticles and either a photoacid, wherein the photoacid is also adsorbed on the surfaces of the nanoparticles, or decomposition products resulting from decomposition of a photoacid by irradiation, wherein the decomposition products are also adsorbed on the surfaces of the nanoparticles, wherein the decomposition products are organic components, acidic components, protons, cationic components, anionic components and/or radical components, in particular protons, cationic components and/or acidic components, in particular protons, wherein the nanoparticles in the composition are colloidal nanoparticles uniformly distributed within the solvent.

Here and in the following chemical constituents of the composition mentioned in singular forms are to be understood as a plurality of molecules of these constituents. For example, the term "a surface ligand adsorbed on the surfaces of the nanoparticles" means that a plurality of molecules of the surface ligand are adsorbed on the surfaces of the nanoparticles and the term "the photoacid is also adsorbed on the surfaces of the nanoparticles" means that a plurality of molecules of the photoacid are also adsorbed on the surfaces of the nanoparticles.

Photoacids are molecules that become more acidic upon electromagnetic irradiation with light, in particular UV light or blue visible light.

The composition according to the invention is solution-processable and an electrochromic layer formed from the composition allows a fast and uniform charge transport by ion migration without having destructive, undesirable effects on the components of the composition and neighboring structures.

The uniform distribution of the nanoparticles within the solvent enables a uniform intercalation of protons in the composition according to the invention. The adsorption of the photoacid on the surfaces of the nanoparticles or the adsorption of the decomposition products of the photoacid on the surfaces of the nanoparticles ensures a direct availability of protons in the electrochromic layer and improves diffusion kinetics due to the relatively short diffusion paths, resulting in a uniform and fast intercalation of protons. The fast and uniform intercalation of protons into the electrochromic material of the nanoparticles ensures a fast and uniform change of color and/or opacity of the electrochromic material upon application of an electric current. Thus, the composition according to the invention results in reliable and uniform electrochromic properties over the whole area and volume of the electrochromic layer formed from the composition.

In contrast to WO 2019/030269 A1, the composition according to the invention comprises a photoacid or decomposition products resulting from decomposition of a photoacid by irradiation. The decomposition products resulting from decomposition of a photoacid by irradiation are organic components, acidic components, protons, cationic components, anionic components and/or radical components. The photoacid and/or the decomposition products of the photoacid are adsorbed on the surfaces of the nanoparticles of electrochromic material. The one or more initiators for initiating radical polymerization of one or more kinds of polymerizable moieties as specified in WO 2019/030269 A1 encompass a multitude of molecules and therefore do not anticipate the photoacid and its decomposition products as specified in the composition according to the invention.

The surface ligand adsorbed on the surfaces of the nanoparticles may be a polar surface ligand. The surface ligand may be an alkylamine, an arylamine, a thiol, an alcohol, a carboxylic acid, a beta alanine, a hexafluoroarsenate ion, a hexafluorophosphate ion, a polyoxometalate ion, a tetrafluoroborate ion, a metal salt, or a mixture of at least two of an alkylamine, an arylamine, a thiol, an alcohol, a carboxylic acid, a beta alanine, a hexafluoroarsenate ion, a hexafluorophosphate ion, a polyoxometalate ion, a tetrafluoroborate ion and a metal salt. The metal salt may be a metal halide or a metal thiocyanate. The metal halide may be a metal chloride, a metal bromide or a metal iodide. The metal may be lithium, sodium, potassium, cesium, aluminum or zinc. The surface ligand adsorbed on the surfaces of the nanoparticles inhibits the agglomeration of nanoparticles. The surface ligand adsorbed on the surfaces of the nanoparticles ensures colloidal stability of the nanoparticles. The colloidal stability of the nanoparticles means that the nanoparticles are evenly dispersed in the solvent without any tendency to agglomerate or to sediment.

The surface ligand adsorbed on the surfaces may be in particular an alkylamine. The alkylamine may be an alkylamine having an alkyl chain of at most eight carbon atoms, in particular an alkylamine having an alkyl chain of at most seven carbon atoms, in particular an alkylamine having an alkyl chain of at most six carbon atoms, in particular an alkylamine having an alkyl chain of at most five carbon atoms, in particular an alkylamine having an alkyl chain of at most four carbon atoms, in particular an alkylamine having an alkyl chain of at most three carbon atoms. The alkylamine may be an octylamine, a heptylamine, a hexylamine, a pentylamine, a butylamine or a propylamine. The alkylamine may be in particular a butylamine. The inventors found that by using an alkylamine having an alkyl chain of at most eight carbon atoms, in particular butylamine, as surface ligand, no additional step is required for removing the surface ligand to obtain an electrically conducting material.

The electrochromic material of the nanoparticles may be a tungsten oxide, a titanium oxide, a vanadium oxide, an iron oxide, an iridium oxide, a rhenium oxide, a niobium oxide, a manganese oxide, a cobalt oxide, a nickel oxide, a zinc oxide, an indium oxide, a tin oxide, a prussian blue-type metal complex or a mixture of at least two of a tungsten oxide, a titanium oxide, a vanadium oxide, an iron oxide, an iridium oxide, a rhenium oxide, a niobium oxide, a manganese oxide, a cobalt oxide, a nickel oxide, a zinc oxide, an indium oxide, a tin oxide and a prussian blue-type metal complex. The electrochromic material of the nanoparticles may be $WO_3$, $TiO_2$, $V_2O_5$, FeO, $Fe_2O_3$, $IrO_2$, $ReO_3$, NbO, $NbO_2$, $Nb_2O_5$, MnO, $Mn_3O_4$, $Mn_2O_3$, $MnO_2$, CoO, NiO, $Ni_2O_3$, ZnO, $In_2O_3$, $SnO_2$ or $Fe_4[Fe(CN)_6]_3$. The nanoparticles are colloidal nanoparticles. The colloidal nanoparticles may be nanocrystals, nanoparticles having a partly crystalline and a partly amorphous structure, or a mixture of nanocrystals and nanoparticles having a partly crystalline and a partly amorphous structure. The colloidal nanoparticles may be a colloidal dispersion of nanoparticles. A colloidal dispersion ensures an even and continuous dispersion of the nanoparticles in the composition according to the invention. If the colloidal nanoparticles have a partly amorphous structure, the maximal achievable contrast of an electrochromic layer produced from the composition may be reduced while the switching speed of the electrochromic layer may be increased. Thus, the overall contrast of the electrochromic switching would be relatively small, but the achievement of contrast would be relatively fast. By using colloidal nanoparticles in the composition according to the invention, a solution-processed fabrication of an electrochromic layer is enabled. Using colloidal nanoparticles in the composition according to the invention also ensures an improved printability of the composition according to the invention. Furthermore, colloidal nanoparticles have an increased active surface area vis-à-vis larger nanoparticles. This improves diffusion kinetics and enables a better intercalation of protons into the nanoparticles. This is particularly useful in electrochromic devices. Due to the relatively short diffusion paths, a more uniform and faster intercalation of protons and/or cations occurs.

The nanoparticles of electrochromic material may be synthesized under inert atmosphere at a temperature in the range of 200° C. to 350° C. using oleylamine. The inert atmosphere may be provided by means of an inert gas, in particular by means of an argon gas, a nitrogen gas or a mixture of an argon gas and a nitrogen gas. By using oleylamine, agglomeration of the nanoparticles may be prevented. Furthermore, due to the high boiling point of oleylamine, which is 364° C., thermal treatment of the electrochromic material may be possible to achieve a high crystallinity of the nanoparticles without evaporation of oleylamine. Accordingly, the use of oleylamine allows obtaining non-agglomerating nanoparticles with high crystallinity which is important for electrochromic performance. The nanoparticles may be spherical nanoparticles and/or cylindrical nanoparticles, in particular nanorods. The cylindrical nanoparticles usually have a particle length and a particle diameter. The particle length may be at most 400 nm, in particular at most 300 nm, in particular at most 200 nm, in particular at most 100 nm, in particular at most 50 nm, in particular at most 25 nm, in particular at most 10 nm. The particle diameter may be at most 10 nm, in particular at most 7 nm, in particular at most 5 nm, in particular at most 2 nm. In the population of nanoparticles at least 96%, in particular at least 97%, in particular at least 98%, in particular at least 99%, in particular 100%, of the particles may have a particle size in the range of 1 nm to 40 nm, in particular in the range of 3 nm to 30 nm, in particular in the range of 7 nm to 25 nm, in particular in the range of 10 nm to 20 nm. The particle size is understood to be the volume equivalent spherical diameter (=VESD). This particle size can be determined by static light scattering, laser diffraction, X-ray diffraction, microscopy, in particular electron microscopy, followed by image analysis, sedimentation analysis and by use of a disc centrifuge.

After synthesis, the oleylamine on the surfaces of the nanoparticles may be exchanged by a liquid-liquid extraction method. Here, the synthesized oleylamine-capped nanoparticles are dispersed in a solvent mixture containing a non-polar solvent and a polar solvent. The non-polar solvent and the polar solvent may be selected such that they are immiscible. The non-polar solvent may be toluene. The polar solvent may be formamide. The polar solvent comprises a polar surface ligand by which oleylamine is to be exchanged. Since the non-polar solvent and the polar solvent comprising the polar surface ligand are immiscible, a two-phase solution is formed. The oleylamine-covered nanoparticles are dispersed in the non-polar solvent phase due to the non-polar oleylamine. The polar surface ligand is dissolved in the polar solvent phase. By mixing the two solvent phases, e.g. by shaking, an exchange of oleylamine to the polar surface ligand takes place on the surfaces of the nanoparticles. After resting, the non-polar layer which now contains free oleylamine separates from the polar solvent phase in which the nanoparticles capped with the polar surface ligand are dispersed. The non-polar solvent phase is removed and discarded followed by addition of further non-polar solvent to the nanoparticle-containing polar solution, whereupon another extraction step can take place. This process is repeated until oleylamine on the surfaces of the nanoparticles has been completely replaced or at least by more than 99.9% w/w replaced by the polar surface ligand.

Replacing the ligand using a liquid-liquid extraction ensures that the relatively large organic molecules of the organic coordinating agent adsorbed to the surfaces of the nanoparticles do not need to be removed thermally or by chemical ligand stripping. Thermal removal involves heating the nanoparticles in the presence of oxygen to 300° C. to 400° C. in order to incinerate the relatively large organic molecules of the organic coordinating agent. Incineration of the organic coordinating agent results in decomposition of the organic coordinating agent. The decomposition products of the organic coordinating agent are carbon dioxide and other combustion by-products. This may result in the formation of bubbles. Furthermore, since the nanoparticles are heated to 300° C. to 400° C. in the presence of oxygen, the nanoparticle material may be oxidized and the nanoparticles may melt together. Melting of the nanoparticles creates agglomeration of nanoparticles with a reduced active surface area. A reduced active surface may result in a relatively slow intercalation of protons/cations in the electrochromic material and a relatively low electrochromic effect. Furthermore, heating to such temperatures may decompose any other organic component in the composition, in particular a photoacid adsorbed on the surfaces of the nanoparticles. During removal of the organic coordinating agent from the surfaces of the nanoparticles by chemical ligand stripping, the acidity of the stripping agent is important, since strong acids can result in unwanted etching of the nanoparticle surfaces and/or dissolution of the nanoparticles. Etching of the nanoparticle surfaces and dissolution of the nanoparticles result in loss of electrochromic material and a reduced connectivity of the nanoparticles. Since the components used for chemical ligand stripping are oxygen-unstable, chemical ligand stripping needs to be performed in an inert environment. Furthermore, chemical ligand stripping may also remove a photoacid adsorbed on the surfaces of the nanoparticles.

Ligand exchange by liquid-liquid extraction ensures that the nanoparticles do not need to be heated up to 300° C. to 400° C. in the presence of oxygen in order to remove oleylamine. In addition, chemical ligand stripping is also not required. Thus, the above mentioned disadvantages can be avoided. Ligand exchange by liquid-liquid extraction is a quick, inexpensive and non-destructive method to exchange oleylamine on the surfaces of nanoparticles with a polar surface ligand, which can be performed at a relative low temperature and without the application of an inert atmosphere.

For forming the composition according to the invention, the photoacid or the decomposition products of the photoacid obtained by irradiation may be dissolved in the solvent. Decomposition products of the photoacid may also be formed by irradiating the solution of the photoacid. The dissolved photoacid or the dissolved decomposition products of the photoacid can be added to the solvent-dispersed or dry nanoparticles with adsorbed surface ligand, thus resulting in the composition according to the invention. Alternatively, the photoacid in dry state or its decomposition products in dry state and the dry nanoparticles can be mixed and the solvent can be added afterwards. For uniformly distributing the nanoparticles within the solvent mixing may be required.

The inventors found that it is advantageous for the adsorption of photoacid and decomposition products of the photoacid on the surfaces of the nanoparticles when the surface ligand adsorbed on the surfaces of the nanoparticles is polar. Since the photoacid and the decomposition products of photoacid are polar, their adsorption on the surfaces of the nanoparticles is the better the more similar the polarity of the photoacid or of the decomposition products of photoacid and the polarity of the surface ligand are.

The solvent may be an organic solvent or a mixture of at least two, in particular a mixture of at least three, in particular a mixture of at least four, in particular a mixture of at least five organic solvents. The organic solvent may be an aromatic hydrocarbon, an amide or an amine. The aromatic hydrocarbon may be toluene. The amide may be formamide or N-methylformamide. The amine may be butylamine or phenethylamine. The solvent ensures solution processability of the composition according to the invention. Accordingly, the composition according to the invention can be present as a colloidal solution, in particular as an ink. The presence of the composition according to the invention as a colloidal solution enables it to be used in multiple processes. Furthermore, application of the composition according to the invention can be performed by spraying, by coating, in particular doctor blade coating, slot die coating, spin coating, dip coating, or by printing, in particular stencil printing, inkjet printing, reverse offset printing or screen-printing.

The photoacid may be a dithiol, a triflate, a triazine, a sulfonate or a mixture of at least two of a dithiol, a triflate, a triazine and a sulfonate. The dithiol may be 1,3,4-thiadiazole-2,5-dithiol. The triflate may be N-hydroxy-napthalamide triflate, diphenylsulphonium triflate, 4-flourophenyldiphenyl sulfonium triflate, 4-methylthiophenyl methyl phenyl sulfonium triflate, (4-iodophenyl) diphenyl sulfonium triflate, (4-phenoxy phenyl) diphenyl sulfonium triflate or (4-methylthiophenyl) phenyl sulfonium triflate. The triazine may be 2-(4-methoxystyryl)-4,6-bis(trichloromethyl)-1,3,5-triazine. The sulfonate may be diphenyliodonium p-toluene sulfonate.

Photoacids are molecules that become more acidic upon electromagnetic irradiation with light, in particular UV light or blue visible light. The electromagnetic irradiation may have a wavelength suitable for decomposition of the photoacid, in particular a wavelength in the range of 200 nm to 500 nm. The irradiation causes either a controlled photodissociation of the photoacid resulting in the production of an acid or a controlled photoassociation, e. g. a ring-forming reaction, resulting in the release of a proton or protons. Photoacids can be divided into reversibly decomposing photoacids and photoacid generators depending on the reversibility of photoacid decomposition. Whilst photoacid generators undergo proton photodissociation irreversibly, reversibly decomposing photoacids can be thermally reassociated after photodissociation.

The decomposition of the photoacid results in decomposition products of the photoacid. The decomposition products of the photoacid may be decomposition products in solid phase, liquid phase and/or gas phase. The decomposition products of the photoacid comprise organic components, acidic components, protons, cationic components, anionic components and/or radical components. To prevent any polymerization in case radicals are formed during irradiation, the composition according to the invention may be a composition that does not comprise any polymerizable moieties. The inventors found that decomposition products in solid phase and liquid phase adsorb to the surfaces of the nanoparticles.

Since any decomposition product of the photoacid in solid phase and liquid phase adsorb to the surface of the nanoparticles, a more precise definition of the decomposition products is not possible without unduly restricting the scope of the invention. The generation and/or presence of the decomposition products of the photoacid and the adsorption of the decomposition products of the photoacid to the surface of the nanoparticles are directly and positively verifiable results. The generation and/or presence of the decomposition products of the photoacid and the adsorption of the decomposition products of the photoacid to the surface of the nanoparticles can be determined by nuclear magnetic resonance spectroscopy, thermogravimetric analysis, Rutherford backscattering spectrometry, mass spectrometry, infrared spectroscopy, Raman spectroscopy and X-ray spectroscopy in combination with nuclear magnetic resonance spectroscopy. Thus, the verification of the generation and/or presence of the decomposition products of the photoacid and the verification of the adsorption of the decomposition products of the photoacid to the surface of the nanoparticles do not require undue experimentation by the person skilled in the art.

Due to their controlled decomposition upon electromagnetic irradiation, photoacids do not exert destructive and unwanted side effects on surrounding materials. This distinguishes photoacids as a source of protons from acids or sacrificial redox agents. If such redox agents are mixed with a polymer forming an electrochromic layer they are characterized by a low stability, decomposition over time, reaction with the polymer or lithium salts and vaporization resulting in bubble formation in the electrochromic layer.

The inventors found that proton release by irreversible photodissociation of photoacid generators or reversible photodissociation of reversibly decomposing photoacids results in a reduced switching voltage required for changing of color or opacity of the electrochromic material in the electrochromic layer formed by the composition.

The total weight of the nanoparticles in relation to the total weight of the composition may be at most 45 wt. %, in particular at most 35 wt. %, in particular at most 25 wt. %, in particular at most 15 wt. %, in particular at most 5 wt. %, in particular at most 0.5 wt. %. The total weight of the surface ligand in relation to the total weight of the composition may be at most 4.5 wt. %, in particular at most 2 wt. %, in particular at most 1 wt. %, in particular at most 0.1 wt. %, in particular at most 0.01 wt. %. The remaining part of the composition may be formed by the solvent and the photoacid or the decomposition products resulting from decomposition of the photoacid. The total weight of the surface ligand is to be understood as the total weight only of the surface ligand adsorbed on the surfaces of the nanoparticles, wherein the same molecule floating freely in the composition is not considered when determining the total weight of the surface ligand. The total weight of the surface ligand can be determined by nuclear magnetic resonance spectroscopy, thermogravimetric analysis, Rutherford backscattering spectrometry, mass spectrometry, infrared spectroscopy, Raman spectroscopy and X-ray spectroscopy in combination with nuclear magnetic resonance spectroscopy. The total weight of the nanoparticles can be determined by weighing the nanoparticles before adding them to the solvent when forming the composition according to the invention. The ratio of the total weight of the nanoparticles to the total weight of the surface ligand may be at least 2:1, in particular at least 5:1, in particular at least 10:1, in particular at least 20:1.

The total weight of the photoacid or of its decomposition products in relation to the total weight of the composition may be at most 5 wt. %, in particular at most 3 wt. %, in particular at most 1 wt. %, in particular at most 0.5 wt. %, in particular at most 0.1 wt. %, in particular at most 0.05 wt. %, in particular at most 0.01 wt. %. The total weight of the photoacid or of its decomposition products is understood as the total weight of the photoacid or of its decomposition products contained in the composition, i.e. the total weight of the photoacid or of its decomposition products adsorbed on the surfaces of the nanoparticles and the total weight of the photoacid or of its decomposition products floating freely in the composition. Therefore, the total weight of the photoacid or of its decomposition products is the total weight of the photoacid added when forming the composition according to the invention except the decomposition products comprises gaseous decomposition products. The total weight of the photoacid or of its decomposition products, the total weight of the photoacid or of its decomposition products adsorbed on the surfaces of the nanoparticles and the total weight of the photoacid or of its decomposition products floating freely in the composition can also be independently from each other determined by nuclear magnetic resonance spectroscopy, thermogravimetric analysis, Rutherford backscattering spectrometry, mass spectrometry, infrared spectroscopy, Raman spectroscopy and X-ray spectroscopy in combination with nuclear magnetic resonance spectroscopy.

The remaining part of the composition may be formed by the solvent. The ratio of the total weight of the nanoparticles to the total weight of the solvent may be at least 1:20 and at most 1:1, in particular at most 1:2, in particular at most 3:10. The inventors found that a relatively high ratio of the total weight of the nanoparticles to the total weight of the solvent in the composition according to the invention results in a composition according to the invention that promotes the formation of a smooth and/or crack-free electrochromic layer. A ratio of the total weight of the nanoparticles to the total weight of the solvent of 3:10, i. e. a concentration of 300 mg of nanoparticles per ml solvent, is typically aimed for, but a higher ratio has been found to be better. When such high concentrations are not possible, the lowest ratio of the total weight of the nanoparticles to the total weight of the solvent resulting in a electrochromic layer of good quality has been found to be 1:20, i. e. a concentration of 50 mg of nanoparticles per ml solvent.

The invention also concerns a method for forming an electrochromic layer on a substrate comprising the steps of a) providing the composition according to the invention and a solid substrate, b) applying the composition to a surface of the substrate, c) heating the composition on the substrate or the substrate together with the composition to a temperature, wherein the temperature is a temperature in the range of 25° C. to 200° C., more particularly a temperature in the range of 40° C. to 150° C., more particularly a temperature in the range of 60° C. to 120° C., more particularly a temperature in the range of 80° C. to 100° C., and maintaining the composition or the substrate together with the composition at the temperature and i.—in case the photoacid instead of its decomposition product is adsorbed on the surfaces of the nanoparticles—waiting until at least 90% by weight of the initial weight of the solvent is evaporated and irradiating the composition on the substrate with an electromagnetic irradiation of a wavelength suitable for decomposition of the photoacid, wherein the wavelength is a wavelength in the range of 200 nm to 500 nm or ii.—in case the decomposition product of the photoacid is adsorbed on the surfaces of the nanoparticles—waiting until at least 90% by weight of the initial weight of the solvent is evaporated, wherein the decomposition products are organic components, acidic components, protons, cationic components, anionic components and/or radical components, in particular protons, cationic components and/or acidic components, in particular protons, wherein evaporation of the solvent is measured by determination of a loss of total weight of the substrate and the composition on the substrate.

The initial weight of the solvent can be determined by weighing of the solvent before providing/preparing the composition according to the invention. The evaporation of the solvent can be determined either by weighing of the substrate together with the composition during or before and after the waiting according to step d) and/or by mass spectrometry or thermal gravimetric analysis.

Applying the composition according to the invention to the substrate according to step b) may be performed by spraying, by coating, in particular doctor blade coating, spin coating, dip coating, or by printing, in particular stencil printing, reverse roll printing, inkjet printing or screen-printing.

The waiting according to step d) may be for at least 30 seconds, in particular for at least 1 minute, in particular for at least 2 minutes, in particular for at least 3 minutes, in particular for at least 5 minutes, and for at most 30 minutes, in particular for at most 25 minutes, in particular for at most 20 minutes, in particular for at most 15 minutes, in particular for at most 10 minutes, in particular for at most 8 minutes, in particular for at most 6 minutes.

Irradiation according to step d) can start before, during or after at least 90% by weight of the initial weight of the solvent is evaporated. By waiting until at least 90% by weight of the initial weight of the solvent is evaporated before irradiating any damage to the colloidal stability of the ink which could damage the layer can be prevented. Irradiation according to step d) can be performed by irradiating the composition on the substrate or the substrate together with the composition with a light source, in particular with a UV lamp or a blue light lamp.

The substrate may comprise an electrically insulating base layer, in particular an electrically insulating base layer comprising or consisting of electrically insulating glass, electrically insulating foil or electrically insulating paper. The substrate may further comprise an electrically conducting surface layer, in particular an electrically conducting surface layer applied on the electrically insulating base layer. The electrically conducting surface layer may be applied on the electrically insulating base layer by sputtering, evaporation, spraying, by coating, in particular doctor blade coating, spin coating, dip coating, or by printing, in particular stencil printing, reverse roll printing, inkjet printing or screen-printing. The electrically conducting surface layer may be arranged between the electrically insulating base layer and the electrochromic layer. The electrically conducting surface layer may comprise or consist of an electrically conducting glass, an electrically conducting foil, an electrically conducting paper, indium tin oxide, aluminum zinc oxide, carbon nanotubes, graphene, metal nanowires, metal nanoframe, an electrically conducting polymer, an organic electrochromic material, an inorganic electrochromic material or a solid electrolyte. The electrically conducting foil may be electrically conducting plastic foil. Metal nanoframes can be created by printing particular temperature sensitive salts of a metal in a pattern, which when heated create the resultant conductive metal. The metal nanoframe may be silver nanoframe, gold nanoframe or copper nanoframe. The organic electrochromic material may be poly (3,4-ethylenedioxythiophene) polystyrene sulfonate (PEDOT:PSS). The electrically conducting surface layer may have a thickness in a range of 50 nm to 250 nm, in particular in a range of 80 nm to 220 nm, in particular in a range of 100 nm to 200 nm, in particular in a range of 125 nm to 175 nm, A substrate comprising a polyethylene terephthalate film as electrically insulating base layer coated with indium tin oxide as electrically conducting surface layer can be purchased from Sigma Aldrich, Taufkirchen, Germany (https://www.sigmaal-drich.com/DE/de/product/aldrich/639303). The substrate may optionally further comprise an oxide layer coated on the electrically conducting surface layer. The oxide layer usually is electrically conducting. The oxide layer may be arranged between the electrically conducting surface layer and the electrochromic layer. The oxide layer may comprise or consist of tin oxide, zinc oxide or cerium oxide. The oxide layer may be applied to the electrically conducting surface layer by coating, in particular doctor blade coating, slot die coating, spin coating or dip coating. The oxide layer may improve the quality of the electrochromic layer by ensuring an optically clear, smooth and crack-free layer. The oxide layer may have a thickness in a range of 1 nm to 50 nm, in particular in a range of 5 nm to 30 nm, in particular in a range of 10 nm to 20 nm. An oxide layer thickness of at most 50 nm ensures a relatively low electrical resistance that may be formed between the electrochromic layer and the electrically conducting surface layer.

The inventors found that the temperature may influence the formation of the electrochromic layer. In case of the composition of below described Example 1 a temperature below 60° C. and a temperature above 110° C. may result in an uneven and rough electrochromic layer.

The solvent may be an organic solvent or a mixture of at least two, in particular a mixture of at least three, in particular a mixture of at least four, in particular a mixture of at least five organic solvents. The organic solvent may be an aromatic hydrocarbon, an amide or an amine. The aromatic hydrocarbon may be toluene. The amide may be formamide or N-methylformamide. The amine may be butylamine or phenethylamine. The mixture of organic solvents may be a mixture of at least two, in particular a mixture of at least three, in particular a mixture of at least four, in particular a mixture of at least five organic solvents with different boiling points and/or evaporation rates.

The inventors found that by using a mixture of at least two organic solvents with different boiling points and/or evaporation rates, the evaporation of the solvent in step d) may be extended over the whole duration of step d). This may result in the formation of a homogenous and flat electrochromic layer.

Heating the composition on the substrate to a temperature according to step c) and/or waiting at least until 90% by weight of the solvent is evaporated may be performed in an inert atmosphere. The inert atmosphere may be provided by means of an inert gas, in particular by means of an argon gas, a nitrogen gas or a mixture of an argon gas and a nitrogen gas. Heating the composition on the substrate or the substrate together with the composition to the temperature and maintaining the temperature according to steps c) results in the evaporation of the solvent and drying of the composition. This results in the formation of a solid electrochromic layer. When at least 90% by weight of the initial weight of the solvent is evaporated the electrochromic layer on the substrate usually appears to be hard and dry though residual solvent is present in the electrochromic layer. The residual solvent usually evaporates over time, even if the temperature is not further maintained. The solid electrochromic layer may be a film having a thickness in the range of 20 nm to 2000 nm, in particular a film having a thickness in the range of 50 nm to 1000 nm, in particular a film having a thickness in the range of 100 nm to 500 nm. Maintaining the temperature according to step c) improves the crystallinity of the nanoparticles of electrochromic material. Maintaining the temperature according to step c) also enables a thermal annealing of the electrochromic layer. The thermal annealing of the electrochromic layer modifies the surface morphology of the electrochromic layer and improves the crystallinity of the nanoparticles of electrochromic material in the electrochromic layer. The thermal annealing of the formed electrochromic layer results in intrinsic stress liberation, structural improving and surface roughness control of the electrochromic layer.

The composition on the substrate may be further heated to a further temperature, wherein the further temperature is a temperature in the range of 30° C. to 250° C., more particularly a temperature in the range of 50° C. to 200° C., more particularly a temperature in the range of 70° C. to 150° C., more particularly a temperature in the range of 100° C. to 120° C. The further heating of the composition on the substrate may be performed after step c) or even after step d). The further heating of the composition on the substrate may be performed in an inert atmosphere. The inert atmosphere may be provided by means of an inert gas, in particular by means of an argon gas, a nitrogen gas or a mixture of an argon gas and a nitrogen gas. The further heating may enable a further thermal annealing of the formed electrochromic layer. The further thermal annealing may further modify the surface morphology of the electrochromic layer and may further improve the crystallinity of the nanoparticles of electrochromic material in the electrochromic layer. The further thermal annealing of the formed electrochromic layer may result in further intrinsic stress liberation, further structural improving and further surface roughness control of the electrochromic layer.

Electromagnetic irradiation of the composition on the substrate according to step d), in particular electromagnetic irradiation with UV light or blue visible light, results in a controlled decomposition of the photoacid. This results in photodissociation of the photoacid into decomposition products of the photoacid including proton(s). Photodissociation is irreversible for photoacid generators and reversible for reversibly decomposing photoacids. After release of the proton(s) by photodissociation, the photoacid is a decomposed photoacid. Release of the proton(s) by decomposition of the photoacid adsorbed on the surfaces of the nanoparticles results in a charging of the nanoparticles. Charging of the nanoparticles refers to the close proximity of the nanoparticles and the protons, in particular the protons adsorbed on the surfaces of the nanoparticles. As a result, the diffusion paths of the protons to the electrochromic material forming the nanoparticles are relatively short. However, there is no spontaneous intercalation of protons into the electrochromic material of the nanoparticles. In order to intercalate protons into the electrochromic material of the nanoparticles, an electric current must be applied. The electric current may be formed between two electrodes between which the electrochromic layer is arranged. One of the electrodes may be formed by the substrate.

The inventors found that proton release by irreversible photodissociation of photoacid generators or reversible photodissociation of reversibly decomposing photoacids results in an electrochromic layer with a relative low switching voltage required for changing of color or opacity of the electrochromic layer.

In case further steps of processing the electrochromic layer on the substrate requires a lower temperature of the electrochromic layer on the substrate or the electrochromic layer on the substrate shall be stored or shipped before further process steps or in any other case, the composition on the substrate or the substrate together with the composition may be cooled to an additional further temperature. The additional further temperature usually is ambient temperature, in particular a temperature in the range of 0° C. to less than 25° C., more particularly a temperature in the range of 5° C. to 24° C., more particularly a temperature in the range of 10° C. to 23° C. Cooling can be performed by active cooling but usually is passive cooling, i. e. by letting the composition on the substrate or the substrate together with the composition cool down to the ambient temperature. The cooling is usually performed during or after step d).

The invention further concerns an electrochromic device comprising an electrochromic layer obtained from the composition according to the invention and a solid substrate. The electrochromic layer is formed by the method according to the invention. The electrochromic layer and the substrate are in electrically conductive contact to each other.

The substrate may comprise an electrically insulating base layer, in particular an electrically insulating base layer comprising or consisting of electrically insulating glass, electrically insulating foil or electrically insulating paper. The substrate may further comprise an electrically conducting surface layer, in particular an electrically conducting surface layer applied on the electrically insulating base layer. The electrically conducting surface layer may be applied on the electrically insulating base layer by sputtering, evaporation, spraying, by coating, in particular doctor blade coating, spin coating, dip coating, or by printing, in particular stencil printing, reverse roll printing, inkjet printing or screen-printing. The electrically conducting surface layer may be arranged between the electrically insulating base layer and the electrochromic layer. The electrically conducting surface layer may comprise or consist of an electrically conducting glass. an electrically conducting foil, an electrically conducting paper, indium tin oxide, aluminum zinc oxide, carbon nanotubes, graphene, metal nanowires, metal nanoframe, an electrically conducting polymer, an organic electrochromic material, an inorganic electrochromic material or a solid electrolyte. The electrically conducting foil may be electrically conducting plastic foil. The metal nanoframe may be silver nanoframe, gold nanoframe or copper nanoframe. The organic electrochromic material may be poly(3.4-ethylenedioxythiophene) polystyrene sulfonate (PEDOT:PSS). The electrically conducting surface layer may have a thickness in a range of 50 nm to 250 nm, in particular in a range of 80 nm to 220 nm, in particular in a range of 100 nm to 200 nm, in particular in a range of 125 nm to 175 nm. A substrate comprising a polyethylene terephthalate film as electrically insulating base layer coated with indium tin oxide as electrically conducting surface layer can be purchased from Sigma Aldrich, Taufkirchen, Germany (https://www.sigmaaldrich.com/DE/de/product/aldrich/639303). The substrate may optionally further comprise an oxide layer coated on the electrically conducting surface layer. The oxide layer usually is electrically conducting. The oxide layer may be arranged between the electrically conducting surface layer and the electrochromic layer. The oxide layer may comprise or consist of tin oxide, zinc oxide or cerium oxide. The oxide layer may be applied to the electrically conducting surface layer by coating, in particular doctor blade coating, slot die coating, spin coating or dip coating. The oxide layer may improve the quality of the electrochromic layer by ensuring an optically clear, smooth and crack-free layer. The oxide layer may have a thickness in a range of 1 nm to 50 nm, in particular in a range of 5 nm to 30 nm, in particular in a range of 10 nm to 20 nm. An oxide layer thickness of at most 50 nm ensures a relatively low electrical resistance that may be formed between the electrochromic layer and the electrically conducting surface layer. The substrate may form an electrode.

The electrochromic device may further comprise a solid further substrate and an ion conducting electrolyte. The further substrate may comprise, independently from the above mentioned substrate, a further electrically insulating base layer, in particular a further electrically insulating base layer comprising or consisting of electrically insulating glass, electrically insulating foil or electrically insulating paper. The further substrate may further comprise a further electrically conducting surface layer, in particular a further electrically conducting surface layer applied on the further electrically insulating base layer. The further electrically conducting surface layer may be applied on the further electrically insulating base layer by sputtering, evaporation, spraying, by coating, in particular doctor blade coating, spin coating, dip coating, or by printing, in particular stencil printing, reverse roll printing, inkjet printing or screen-printing. In the electrochromic device, the further electrically conducting surface layer may be arranged between the further electrically insulating base layer and the ion conducting electrolyte or, in the absence of the ion conducting electrolyte, may be arranged between the further electrically insulating base layer and the electrochromic layer. The further electrically conducting surface layer may comprise or consist of an electrically conducting glass, an electrically conducting foil, an electrically conducting paper, indium tin oxide, aluminum zinc oxide, carbon nanotubes, graphene, metal nanowires, metal nanoframe, an electrically conducting polymer, an organic electrochromic material, an inorganic electrochromic material or a solid electrolyte. The electrically conducting foil may be electrically conducting plastic foil. The metal nanoframe may be silver nanoframe, gold nanoframe or copper nanoframe. The organic electrochromic material may be poly(3,4-ethylenedioxythiophene) polystyrene sulfonate (PEDOT:PSS). The further electrically conducting surface layer may have a thickness in a range of 50 nm to 250 nm, in particular in a range of 80 nm to 220 nm, in particular in a range of 100 nm to 200 nm, in particular in a range of 125 nm to 175 nm. The further substrate may optionally further comprise a further oxide layer coated on the further electrically conducting surface layer. The further oxide layer usually is electrically conducting. In the electrochromic device, the further oxide layer may be arranged between the further electrically conducting surface layer and the ion conducting electrolyte or, in the absence of the ion conducting electrolyte, may be arranged between the further electrically conducting surface layer and the electrochromic layer. The further oxide layer may comprise or consist of tin oxide, zinc oxide or cerium oxide. The further oxide layer may be applied to the further electrically conducting surface layer by coating, in particular doctor blade coating, spin coating or dip coating. The oxide layer may have a thickness in a range of 10 nm to 300 nm, in particular in a range of 50 nm to 250 nm, in particular in a range of 100 nm to 200 nm. The further substrate may form a counter electrode with respect to the electrode formed by the substrate. The thickness of the further oxide layer ensures that the further oxide layer can be filled with protons/cations from the electrochromic layer or from the ion conducting electrolyte upon application of a voltage that directs the movement of the protons/cations from the electrode towards the counter electrode.

The ion conducting electrolyte may be arranged between the electrochromic layer and the further substrate. The ion conducting electrolyte may be an electrically insulating ion conducting electrolyte. An electrically insulating ion conducting electrolyte may be an electrically insulating electrolyte comprising mobile ions that can move under the application of a voltage. The ion conducting electrolyte may be a liquid electrolyte, a gel electrolyte, a solid electrolyte or a polymer. The liquid electrolyte may be an organic liquid electrolyte or an inorganic liquid electrolyte. The gel electrolyte may be an organic gel electrolyte or an inorganic gel electrolyte. The solid electrolyte may be an organic solid electrolyte or an inorganic solid electrolyte. The ion conducting electrolyte may comprise mobile ions, in particular lithium ions, sodium ions, aluminum ions or protons. The ion conducting electrolyte may comprise lithium bis(triflouromethanesulfonyl) imide and polymethylmethacrylate.

The electrochromic device may be used for generating an electrochromic effect. For this purpose, a voltage may be applied to the electrode and the counter electrode. The voltage may be a voltage in the range of 0V and 20V, in particular a voltage in the range of 0.1V and 15V, in particular a voltage in the range of 0.5V and 10V, in particular a voltage in the range of 1V and 5V, in particular a voltage in the range of 2V and 3V. Applying the voltage results in an electrochromic effect of the electrochromic device. The magnitude of the applied voltage may influence the intensity of the electrochromic effect of the electrochromic device. This enables a tunable achievable contrast and therefore a tunable coloration or discoloration of the electrochromic device.

The invention further concerns a use of the composition according to the invention for forming an electrochromic layer.

All features indicated in the specification are to be understood as features applicable to all embodiments of the invention. This means, for example, that a feature specified for the composition according to the invention can also be applied to the method according to the invention, the electrochromic device according to the invention and/or the use according to the invention, and vice versa.

EXAMPLES

Example 1: Ink Formulation 20 mL of oleylamine and 0.1 mmol of ammonium meta tungstate are added to a 50 mL three-necked flask and heated to 250° C. under nitrogen atmosphere for two hours. This results in the formation of a thick, deep blue colloidal solution of nanoparticles in the form of tungsten oxide nanocrystals suspended in oleylamine. Subsequently, 20 mL of ethanol is added to the solution and the mixture centrifuged. The supernatant containing oleylamine and ethanol is removed leaving solid nanocrystals. The nanocrystals are redispersed in 5 mL of toluene and 5 mL of ethanol are added. The mixture is centrifuged, the supernatant discarded and the nanocrystals redispersed in 5 mL toluene. This results in the removal of excess oleylamine, however some oleylamine is still adsorbed on the tungsten oxide nanocrystal surfaces resulting in oleylamine-capped nanocrystals. This is necessary to ensure colloidal stability since a bare nanocrystal cannot be suspended in solution but instead would agglomerate.

3 mL toluene, 2 mL formamide and 2 mL butylamine are added to 1 mL of the above prepared nanocrystal solution in toluene. Since toluene and formamide are immiscible, a two phase solution is formed. The oleylamine-capped nanocrystals are dispersed in the toluene phase, which can be seen by a blue coloration of the toluene phase. The free butylamine is dissolved in the formamide phase. Shaking the two-phase mixture results in an exchange from oleylamine to butylamine as surface ligand of the tungsten oxide nanoparticles. The resulting free oleylamine dissolves in toluene, while the butylamine-capped nanocrystals are dispersed in the formamide phase. This can be observed from a transition of blue coloration from the toluene phase to the formamide phase. After a rest period of 2 minutes, the toluene phase settles with the free oleylamine as the top layer. The top layer is removed and discarded. 1 mL butylamine and 6 mL toluene are added to the formamide phase and the extraction step is repeated four times to exchange all oleylamine on the surfaces of the nanoparticles with butylamine. Since some formamide is also removed each time the top layer is removed, there is a steady decrease in the volume of formamide and a simultaneous increase in the concentration of nanocrystals until eventually a solid mass of butylamine-capped nanocrystals is left on the bottom of the exchange vessel.

Subsequently, 20 mg of the photoacid 2-(4-Methoxystyryl)-4,6-bis-(trichlormethyl)-1,3,5-triazin are dissolved in 0.5 mL N-methyl formamide and 0.5 mL butylamine which results in a pale slightly yellow colored solution. 1 mL of this solution is added to the above obtained solid blue nanocrystals. The solution is mixed in order to disperse the nanocrystals. N-methyl formamide is miscible with toluene. The photoacid is—together with butylamine—adsorbed on the surfaces of the nanocrystals. 4 mL toluene is added to the solution and the solution centrifuged. The nanocrystals are recovered and the supernatant is discarded.

The solid mass of nanocrystals is dispersed in a mixture of 50% N-methylformamide, 30% formamide, 17% butylamine and 3% phenethylamine (mixture of organic solvents) which results in a thick blue ink as a composition according to the invention. The concentration of solid mass in the ink is adjusted to a concentration of 200 mg/mL.

Example 2: Formation of an Electrochromic Layer

An ink comprising butylamine (surface ligand adsorbed on the surfaces of the nanoparticles) and 2-(4-Methoxystyryl)-4,6-bis-(trichlormethyl)-1,3,5-triazin (photoacid adsorbed on the surfaces of the nanoparticles) both adsorbed on the surfaces of tungsten oxide nanoparticles (nanoparticles of electrochromic material) dispersed in a solvent comprising N-methylformamide, formamide, butylamine and phenethylamine is coated on indium tin oxide (electrically conducting surface layer) coated plastic foil (electrically insulating base layer) using the doctor blade technique. The coated film is heated to 80° C. for 2 min resulting in drying of the film. After drying, the film is cooled to 25° C. and irradiated with UV light for 30 min.

An electrochromic device is assembled by combination of the electrode (substrate), the electrochromic layer, a lithium filled polymer (ion conducting electrolyte) and a counter electrode (further substrate). The counter electrode is created by coating a thin layer of tin oxide (further oxide layer) on a second indium tin oxide coated (further electrically conducting surface layer) plastic foil (further electrically insulating base layer) using the doctor blade technique. This solution of tin oxide is purchased a from commercial supplier (https://www.alfa.com/en/catalog/044592/). The lithium filled polymer is prepared by dissolving 200 mg of lithium bis(triflouromethanesulfonyl) imide and 0.25 g of polymethylmethacrylate (molecular weight ~15000) in 1 ml of propylene carbonate. 100 μl of this gel like mixture is placed on top of the electrochromic layer, and the counter electrode placed on top, so that the electrode and the counter electrode are facing one another. The device is held shut using a pair of clips applying pressure, and heated to 100° C. in an inert atmosphere for 48 hours to allow the propylene carbonate to evaporate, leaving behind solid polymethylmethacrylate and lithium. To operate the electrochromic device, a voltage of between 0V and 4V is applied to the electrode and the counter electrode, which causes the tunable colouration or discolouration of the electrochromic effect within the device.

The invention claimed is:

1. A composition for forming an electrochromic layer, comprising:
   a) a solvent,
   b) nanoparticles of electrochromic material, wherein the nanoparticles are colloidal nanoparticles uniformly distributed within the solvent,
   c) a surface ligand adsorbed on the surfaces of the nanoparticles, and
   d) a photoacid, wherein the photoacid is also adsorbed on the surfaces of the nanoparticles, wherein the photoacid is a polar molecule that becomes more acidic upon electromagnetic irradiation with light.

2. The composition according to claim 1, wherein the photoacid is a dithiol, a triflate, a triazine, a sulfonate or a mixture of at least two of a dithiol, a triflate, a triazine and a sulfonate.

3. The composition according to claim 2, wherein the dithiol is 1,3,4-thiadiazole-2,5-dithiol, wherein the triflate is N-hydroxy-napthalamide triflate, diphenylsulphonium triflate, 4-flourophenyldiphenyl sulfonium triflate, 4-methylthiophenyl methyl phenyl sulfonium triflate, (4-iodophenyl) diphenyl sulfonium triflate, (4-phenoxy phenyl) diphenyl sulfonium triflate or (4-methylthiophenyl) phenyl sulfonium triflate, wherein the triazine is 2-(4-methoxystyryl)-4,6-bis (trichloromethyl)-1,3,5-triazine, wherein the sulfonate is diphenyliodonium p-toluene sulfonate.

4. The composition according to claim 1, wherein the surface ligand adsorbed on the surfaces of the nanoparticles is an alkylamine, an arylamine, a thiol, an alcohol, a carboxylic acid, a beta alanine, a hexafluoroarsenate ion, a hexafluorophosphate ion, a polyoxometalate ion, a tetrafluoroborate ion, a metal salt, in particular a metal halide or a metal thiocyanate, or a mixture of at least two of an alkylamine, an arylamine, a thiol, an alcohol, a carboxylic acid, a beta alanine, a hexafluoroarsenate ion, a hexafluorophosphate ion, a polyoxometalate ion, a tetrafluoroborate ion and a metal salt, in particular a metal halide or a metal thiocyanate.

5. The composition according to claim 4, wherein the alkylamine is an alkylamine having an alkyl chain of at most eight carbon atoms, in particular an alkylamine having an alkyl chain of at most four carbon atoms, and wherein the metal halide is a metal chloride, a metal bromide or a metal iodide, and wherein the metal is lithium, sodium, potassium, cesium, aluminum or zinc.

6. The composition according to claim 4, wherein the alkylamine is an octylamine, a heptylamine, a hexylamine, a pentylamine or a butylamine.

7. The composition according to claim 1, wherein the electrochromic material is a tungsten oxide, a titanium oxide, a vanadium oxide, an iron oxide, an iridium oxide, a rhenium oxide, a niobium oxide, a manganese oxide, a cobalt oxide, a nickel oxide, a zinc oxide, an indium oxide, a tin oxide, a prussian blue-type metal complex or a mixture of at least two of a tungsten oxide, a titanium oxide, a vanadium oxide, an iron oxide, an iridium oxide, a rhenium oxide, a niobium oxide, a manganese oxide, a cobalt oxide, a nickel oxide, a zinc oxide, an indium oxide, a tin oxide and a prussian blue-type metal complex.

8. The composition according to claim 1, wherein the electrochromic material is $WO_3$, $TiO_2$, $V_2O_5$, FeO, $Fe_2O_3$, $IrO_2$, $ReO_3$, NbO, $NbO_2$, $Nb_2O_5$, MnO, $Mn_3O_4$, $Mn_2O_3$, $MnO_2$, CoO, NiO, $Ni_2O_3$, ZnO, $In_2O_3$, $SnO_2$ or $Fe_4[Fe(CN)_6]_3$.

9. The composition according to claim 1, wherein the solvent is an organic solvent, in particular an aromatic hydrocarbon, an amide or an amine.

10. The composition according to claim 1, wherein the total weight of the nanoparticles in relation to the total weight of the composition is at most 45 wt. %, in particular at most 25 wt. %, wherein the total weight of the surface ligand in relation to the total weight of the composition is at most 4.5 wt. %, in particular at most 2 wt. %, wherein the ratio of the total weight of the nanoparticles to the total weight of the surface ligand is at least 10:1.

11. A method for forming an electrochromic layer on a substrate comprising the steps of:

a) providing a composition and a solid substrate, wherein the composition comprises:
   i. a solvent,
   ii. nanoparticles of electrochromic material, wherein the nanoparticles are colloidal nanoparticles uniformly distributed within the solvent,
   iii. a surface ligand adsorbed on the surfaces of the nanoparticles, and
   iv. a photoacid, wherein the photoacid is also adsorbed on the surfaces of the nanoparticles, wherein the photoacid is a polar molecule that becomes more acidic upon electromagnetic irradiation with light,
b) applying the composition to a surface of the substrate,
c) heating the composition on the substrate or the substrate together with the composition to a temperature, wherein the temperature is a temperature in the range of 25° C. to 200° C. and maintaining the composition or the substrate together with the composition at the temperature, and
d) waiting until at least 90% by weight of the initial weight of the solvent is evaporated and irradiating the composition on the substrate with an electromagnetic irradiation of a wavelength suitable for decomposition of the photoacid, wherein the wavelength is a wavelength in the range of 200 nm to 500, and wherein evaporation of the solvent is measured by determination of a loss of total weight of the substrate and the composition on the substrate.

12. The method according to claim 11, wherein the substrate comprises an electrically insulating base layer, in particular an electrically insulating base layer comprising or consisting of electrically insulating glass, wherein the substrate further comprises an electrically conducting surface layer applied on the electrically insulating base layer, which electrically conducting surface layer comprises or consists of an electrically conducting glass, an electrically conducting foil, an electrically conducting paper, indium tin oxide, aluminum zinc oxide, carbon nanotubes, graphene, metal nanowires, an electrically conducting polymer, an organic electrochromic material, an inorganic electrochromic material or a solid electrolyte, wherein the substrate optionally further comprises an oxide layer coated on the electrically conducting surface layer which oxide layer comprises or consists of tin oxide, zinc oxide or cerium oxide.

13. An electrochromic device comprising:

an electrochromic layer and a solid substrate, wherein the electrochromic layer is formed by:

a) applying a composition to a surface of the substrate, wherein the composition comprises:
   i. a solvent,
   ii. nanoparticles of electrochromic material, wherein the nanoparticles are colloidal nanoparticles uniformly distributed within the solvent,
   iii. a surface ligand adsorbed on the surfaces of the nanoparticles, and
   iv. a photoacid, wherein the photoacid is also adsorbed on the surfaces of the nanoparticles, wherein the photoacid is a polar molecule that becomes more acidic upon electromagnetic irradiation with light,
c) heating the composition on the substrate or the substrate together with the composition to a temperature, wherein the temperature is a temperature in the range of 25° C. to 200° C. and maintaining the composition or the substrate together with the composition at the temperature and
d) waiting until at least 90% by weight of the initial weight of the solvent is evaporated and irradiating the composition on the substrate with an electromagnetic irradiation of a wavelength suitable for decomposition of the photoacid, wherein the wavelength is a wavelength in the range of 200 nm to 500, and wherein evaporation of the solvent is measured by determination of a loss of total weight of the substrate and the composition on the substrate, wherein the electrochromic layer and the substrate are in electrically conductive contact to each other.

14. The electrochromic device according to claim 13, wherein the substrate comprises an electrically insulating base layer, in particular an electrically insulating base layer comprising or consisting of electrically insulating glass, wherein the substrate further comprises an electrically conducting surface layer applied on the electrically insulating base layer, which electrically conducting surface layer comprises or consists of an electrically conducting glass, an electrically conducting foil, an electrically conducting paper, indium tin oxide, aluminum zinc oxide, carbon nanotubes, graphene, metal nanowires, an electrically conducting polymer, an organic electrochromic material, an inorganic electrochromic material or a solid electrolyte, wherein the substrate optionally further comprises an oxide layer coated on the electrically conducting surface layer which oxide layer comprises or consists of tin oxide, zinc oxide or cerium oxide.

* * * * *